D. MACKAY.
APPARATUS FOR INDICATING THE TRIM OF A SHIP, VESSEL, OR THE LIKE.
APPLICATION FILED NOV. 28, 1910.

1,031,799. Patented July 9, 1912.

WITNESSES
W. P. Burke
John C. Sanders

INVENTOR
Donald Mackay
BY
M. Mallan Mit
ATTY.

UNITED STATES PATENT OFFICE.

DONALD MACKAY, OF ALLOA, SCOTLAND.

APPARATUS FOR INDICATING THE TRIM OF A SHIP, VESSEL, OR THE LIKE.

1,031,799. Specification of Letters Patent. Patented July 9, 1912.

Application filed November 28, 1910. Serial No. 594,560.

*To all whom it may concern:*

Be it known that I, DONALD MACKAY, subject of the King of Great Britain and Ireland, residing at 4 Grange road, Alloa, in the county of Clackmannan, Scotland, have invented new and useful Improvements in Apparatus for Indicating the Trim of a Ship, Vessel, or the Like, of which the following is a specification.

My said invention relates to apparatus, for indicating the trim of a ship or vessel, of the type in which vertical tubes arranged at the longitudinal center line of the ship and communicating with the sea water are employed, and the object of my invention is to combine therewith a scale whereby the means draft and trim can be ascertained in a simple and expeditious manner.

The apparatus consists of two transparent tubes, arranged vertically, and placed at the center line of the ship, some distance apart, for example, at opposite ends of the engine room. Alongside the tubes are fixed draft marks measured from the keel. The lower ends of the tubes communicate with the water (in which the ship is floating), and which when admitted rises in the tubes to the level of the water outside. In connection with one of the boards, containing the draftmarks, there is a rule marked with a scale, in feet, in the proportion of the fore and aft distance between the tubes to the total length of the ship. This rule can be moved up and down on the draft marks, and when used to measure the difference in the height of water, in the tubes, it gives the "trim" or draft at the bow and stern of the ship.

In order that my said invention may be properly understood I hereunto append a sheet of explanatory drawings, hereinafter referred to in describing my invention.

Figure 1:
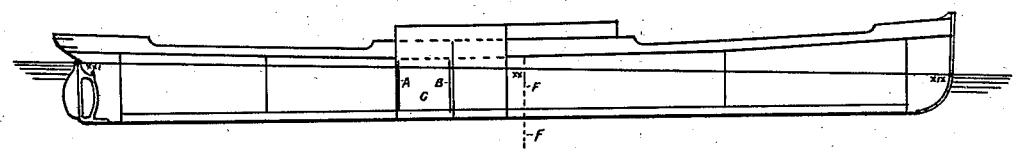
Figure 2:
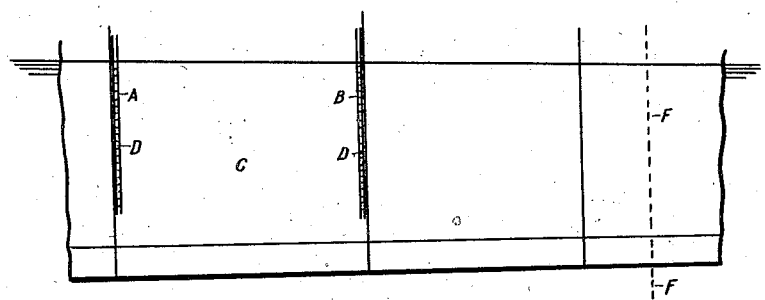
Figure 3:
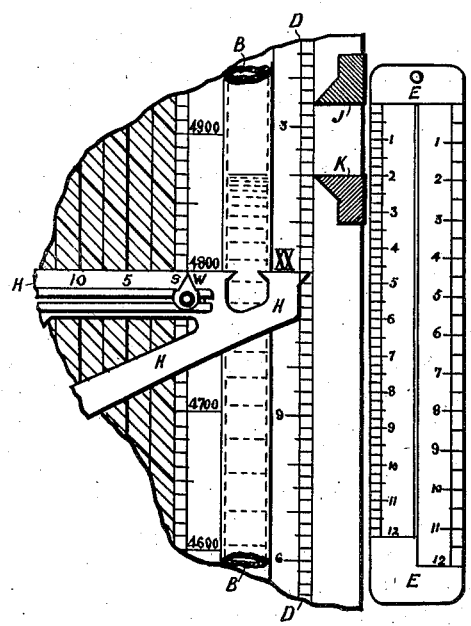

Figure 1, is a side elevation of a vessel showing the relative position of the tubes. Fig. 2, is a detail view drawn to a larger scale. Fig. 3, is a detail view of a part of an indicator with scales arranged to show the mean draft and deadweight.

As shown in Figs. 1 and 2, the apparatus consists of two tubes A and B, arranged vertically and placed at the center line of the ship, some distance apart, for example, at opposite ends of the engine room C. Alongside the tubes A and B, are fixed draft marks D, measured from the keel. The lower ends of the tubes A and B, communicate with the water (in which the ship is floating) and which when admitted rises in the tubes to the level of the water outside. A rule E (Fig. 3) is provided, and is marked on the right-hand side with a scale in feet, in the proportion of the fore and aft distance between the tubes A and B, to the total length of the ship. The rule E, can be moved up or down over the draft marks, and when used to measure the difference in the height of the water in the tubes A and B, it indicates the total trim of the ship in feet, half of which trim requires to be added and subtracted from the mean draft in order to ascertain the draft at the stern and bow respectively. The scale on the left-hand side of the rule E, is made in the ratio of the distance between the tubes A and B, to the distance from the tube B, to the dotted line F, and indicates, in inches, the correction to be made upon the draft shown in the tube B, in order to ascertain the draft at the dotted line F, which is the actual mean draft of the ship.

The apparatus is used as follows:—The vessel illustrated (by way of example) in the drawings, is about 360 feet long with a carrying capacity of 4800 tons (in salt water) on a mean draft of 20 feet. The distance between the tubes A and B, is 24 feet, and the distance between the tube B, and the dotted line F, (indicating the position of the mean draft) is 32 feet. The draft having been observed in the tube A, and transferred to a corresponding position on the draft marks of the tube B, the difference in the two drafts is measured by the scale on the left-hand side of the rule E, which shows the correction for the midship or mean draft, amounting in this case to two inches below the level of the water in tube B, equal to 20 feet. The difference in the two drafts is now measured by the scale on the right-hand side of the rule E, which in this case gives a total trim of about 2 feet, showing the draft at the stern to be 21 feet, and at the bow to be 19 feet. Pointers J, K, are provided to respectively indicate the water levels in the tubes A and B. The pointer J indicates the height of the water in the tube A, namely 20 feet, 3½ inches. The pointer K is at the level of the water in the tube B, which is 20 feet, 2 inches. The distance between the two pointers gives a measurement by the scale on the left hand side of the rule E, a correction of two inches, which is equivalent to 20 feet. The distance between the pointers J and K gives on measurement by the scale on the right hand side of the rule E a trim of about 2 feet. The cursor H is now moved to the draft 20 feet and the dead weight reads 4800 tons in salt water. The mean draft having been found in the manner just described, the dead weight or total displacement can be arrived at in a simple and expeditious manner by the use of the scales on the draft indicator board D, the scale on the right-hand side of that board indicating tons dead weight in salt water, while the scale on the left-hand side (not shown) indicates tons dead weight in fresh water, these scales being also arranged to indicate any intermediate density between the extremes of fresh and salt water. To facilitate the reading of the scales a sliding cursor H, is provided.

The deadweight scale is not described herein as it forms the subject matter of my copending application #586,346.

What I claim is:—

1. In apparatus of the class described, in combination, with a vessel's hull, a plurality of vertical tubes spaced apart a predetermined distance in the direction of the length of the hull, draft indicating scales positioned in juxtaposition to said tubes, means connecting said tubes with the water outside of the hull, and indicating means operatively associated with each scale adapted to be moved to indicate thereon the height of the water in the tube associated with the other scale.

2. In apparatus of the class described, in combination with a vessel's hull, a plurality of vertical tubes spaced apart a predetermined distance in the direction of the length of the hull, each of said tubes being positioned a predetermined distance from the mean draft point of the vessel, draft indicating scales positioned in juxtaposition to said tubes, means connecting said tubes with the water outside of the hull, and indicating means operatively associated with each scale adapted to be moved to indicate thereon the height of the water in the tube associated with the other scale.

In testimony whereof I have signed my name to this specification in the presence of two subscribing witnesses.

DONALD MACKAY.

Witnesses:
GEORGE PATTERSON,
FREDERICK PIATT.